United States Patent [19]

Halm

[11] 3,873,861

[45] Mar. 25, 1975

[54] ELECTRIC MOTOR, ESPECIALLY A SQUIRREL-CAGE MOTOR

[76] Inventor: Richard Halm, Silcherstrasse 54, D 7061 Baltmannsweiler, Germany

[22] Filed: June 15, 1973

[21] Appl. No.: 370,541

[52] U.S. Cl. .......................... 310/43, 310/42, 310/87

[51] Int. Cl. .............................................. H02k 1/04

[58] Field of Search .......... 29/596, 205; 310/42, 43, 310/86, 90, 87, 89

[56] References Cited

UNITED STATES PATENTS

| | | | |
|---|---|---|---|
| 3,002,261 | 10/1961 | Avila et al. | 29/596 X |
| 3,075,250 | 1/1963 | Strohm et al. | 310/43 |
| 3,163,369 | 12/1964 | Hogue | 310/43 X |
| 3,256,590 | 6/1966 | Myers | 29/596 |
| 3,333,544 | 8/1967 | Turk | 310/86 |
| 3,742,595 | 7/1973 | Lykes | 310/43 |
| 3,755,889 | 9/1973 | Busian | 310/42 X |
| 3,758,799 | 9/1973 | Dochterman et al. | 310/43 X |

*Primary Examiner*—J. D. Miller
*Assistant Examiner*—Patrick R. Salce
*Attorney, Agent, or Firm*—Roylance, Abrams, Berdo & Kaul

[57] ABSTRACT

An improved electric motor having a housing member comprising a set cast mass forming a solid piece, in which winding leads are embedded. A casing designed for receiving a bearing flange is rigidly connected with the housing member to form one piece, and electrically insulated from the winding of the motor.

3 Claims, 3 Drawing Figures

3 11 21 15 18 20 24 1 22 12 7 19 6 5 10 4 9 13 16 17 2

31b 39b
38b
40b
33b
34a
33a
36a
32a
35a
40a
37a
39a
38a
31a

ELECTRIC MOTOR, ESPECIALLY A SQUIRREL-CAGE MOTOR

The present invention relates to an improved electric motor, especially a squirrel-cage motor, having a rotor, having a housing for receiving a stator with stator winding, and having a bearing flange, whereby at least that section of the housing receiving a portion of the stator winding is of a set cast mass, especially cast resin, forming a solid piece, in which winding leads are embedded.

In a motor of this type, the winding and the switching and flexible leads must be armored, dressed and insulated.

It is the object of the present invention to significantly simplify and greatly reduce the cost of fabrication of electric motors, eliminating the need for special treatment of the stator winding. According to the invention, this object is solved in that a casing is provided which is firmly connected with the housing member and forms one piece therewith, which is electrically insultated from the winding and which receives the bearing flange.

The cast mass forming the housing connects the stator with the casing, eliminating the need for special connecting means. Because of the electrical insulating properties of the cast mass and because of the electrical insulation of the casing toward the winding, the latter, as well as the switching and flexible leads, no longer need to be armored, dressed or insulated. The bearing flanges receiving the bearings for the electric motor can be installed in the casing with the desired degree of accuracy, so that they are sufficiently aligned. The housing can transmit torques and forces, as the members of the electric motor which accept forces and torques are connected one with the other with the desired degree of stability. The casing can be of any desired material which, insofar as it is electrically conductive, must be insulated against the winding, and is fabricated particularly of electrically insulating plastic.

To provide a good connection between the casing and the housing member of a cast mass the casing, for engagement with the housing member of a cast mass, is designed unevenly in a location which is in a contacting relationship with the cast mass, having especially an annular groove for engagement with the cast mass.

The above discussed and other objects, features and advantages of the present invention will become more apparent from the following description thereof, when taken in connection with the accompanying drawings, in which two squirrel-cage motors are schematically illustrated in longitudinal cross sections as practical examples of the subject matter of the invention.

Figure 1:
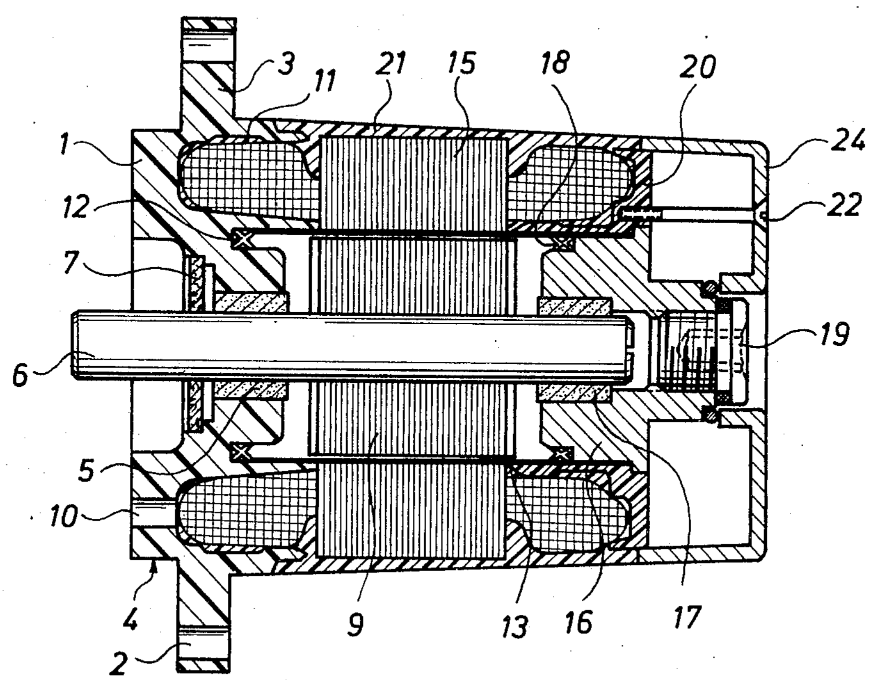
FIG. 1 shows a squirrel-cage motor designed as a canned motor.

Referring now to the drawings, FIG. 1 shows a squirrel-cage motor designed as a canned motor and having an end plate 1, comprising plastic especially, which is simultaneously designed as a casing and bearing flange. The end plate has an annular collar 3, provided with mounting holes 2, which serves to attach an unillustrated pump housing, for which purpose an annular shoulder 4 is provided. Inserted in the end plate 1 is a sleeve bearing 5, comprising carbon especially, which mounts the motor shaft 6 which extends through the bearing. Provided coaxially to sleeve bearing 5 on the side facing the unillustrated pump housing in a sintered ring 7 for filtering liquids. A rotor 9 is attached to motor shaft 6. At least one casting aperture 10 is provided in end plate 1.

End plate 1 has an annular groove in the area of sleeve bearing 5 for a sealing ring 12. This groove for the sealing ring is engaged by one end of a can 13, whose end adjacent to end plate 1 is surrounded by a tubular extension of this end plate 1. Holes extending from end plate 1 to can 13 can be located in the area of can 13. Mounted on can 13 is a press-fitted stator 15 with winding. The winding must only be insulated from end plate 1 if the latter comprises an electrically conductive material. Placed on the end of can 13 facing away from end plate 1 is a bearing flange 16, containing a bearing 17 of carbon mounting motor shaft 6. Bearing flange 16 is inserted firmly in the can, is bonded thereto, and is in a contacting relationship with its end by means of an annular collar. Inserted in a recess in bearing flange 16 between bearing flange 16 and can 13 on the side of rotor 9 is a sealing ring 18.

Bearing flange 16 is surrounded by a casing 20 comprising electrically insulating plastic or, if designed of an electrically conductive material, electrically insulated on at least the stator 15 side. Those sections of casing 20 and end plate 1 extending beneath the winding are conical and act on the winding as a type of expanding mandrel, so that prior prizing of the windings is not necessary. If casing 20 does not extend to stator 15 or is not employed, the outside of can 13 is provided with an electrical insulating layer. The same also applies for the side of the can located in the area of end plate 1.

A screw 19 is inserted in bearing flange 16 and sealed thereagainst by means of a sealing ring. Bearing flange 16 and casing 20 are surrounded by a cover 24 located on the end, said cover 24 being connected with casing 20 by means of a screw 22, protruding around the outside of casing 20, and contacting bearing flange 16, with a sealing ring interposed therebetween, with an inwardly projecting collar.

Stator 15 with winding in embedded in a housing member 21 of a cast mass, especially casting resin or a similar substance. The windings, arranged on both sides of stator 15, engage annular recesses in end plate 1 and casing 20. The outer wall of the annular groove in end plate 1 has a further annular groove 11, in which the casting resin engages, thereby providing secure attachment of end plate 1 to housing member 21. The casting resin forms a compact unit of end plate 1, can 13, stator 15 with stator winding, casing 20 and housing member 21.

A connection member, in which unillustrated switching and flexible leads are brought out from the stator winding 15, can be provided on housing member 21. Like the winding of stator 15, the switching and flexible leads are not armored, dressed or insulated.

To fabricate housing member 21, can 13, on which are mounted casing 20 and stator 15 with winding as well as end plate 1, is placed in a pot-shaped mould in such a manner that end plate 1 covers the top of the mould. After all members have been inserted in their proper location, casting resin or another castable or injectable, electrically insulating moulding substance is introduced through casting aperture 10, filling out the free space in the mould and forming housing member 21 after setting. The mould can be connected to a vacuum source to avoid air pockets. After the casting resin has set, which can be aided by heat treatment if desired, housing member 21, formed from the cast resin, is removed from the mould along with the elements rigidly connected thereto (end plate 1, casing 20, stator 15 and winding). To complete fabrication of the electric motor, motor shaft 6, which mounts rotor 9, is inserted in sleeve bearing 5, and on the side facing the bearing flange, bearing flange 16, which can preferably be of plastic, is inserted in can 13 and bonded thereto. The end of motor shaft 6, having a slot for engagement of a screwdriver, is covered through insertion of screw 19, sealing the rotor space from the outside. Cover 24 is then put in place and connected with casing 20 by means of screws 22. Before motor shaft 6 was placed in can 13, sealing ring 12 was inserted in the corresponding annular groove in end plate 1.

The winding of stator 15, as well as its switching and flexible leads, do not need to be armored, dressed or insulated for being embedded in housing member 21 since, by being embedded in housing member 21, they contact non-conductive elements of the electric motor, thereby providing a significant work savings. In fabricating housing member 21, a casting resin or similar substance is employed which is capable of transmitting the torques and forces occurring in the electric motor and connecting the bearings sufficiently firmly one with the other.

Figure 2:
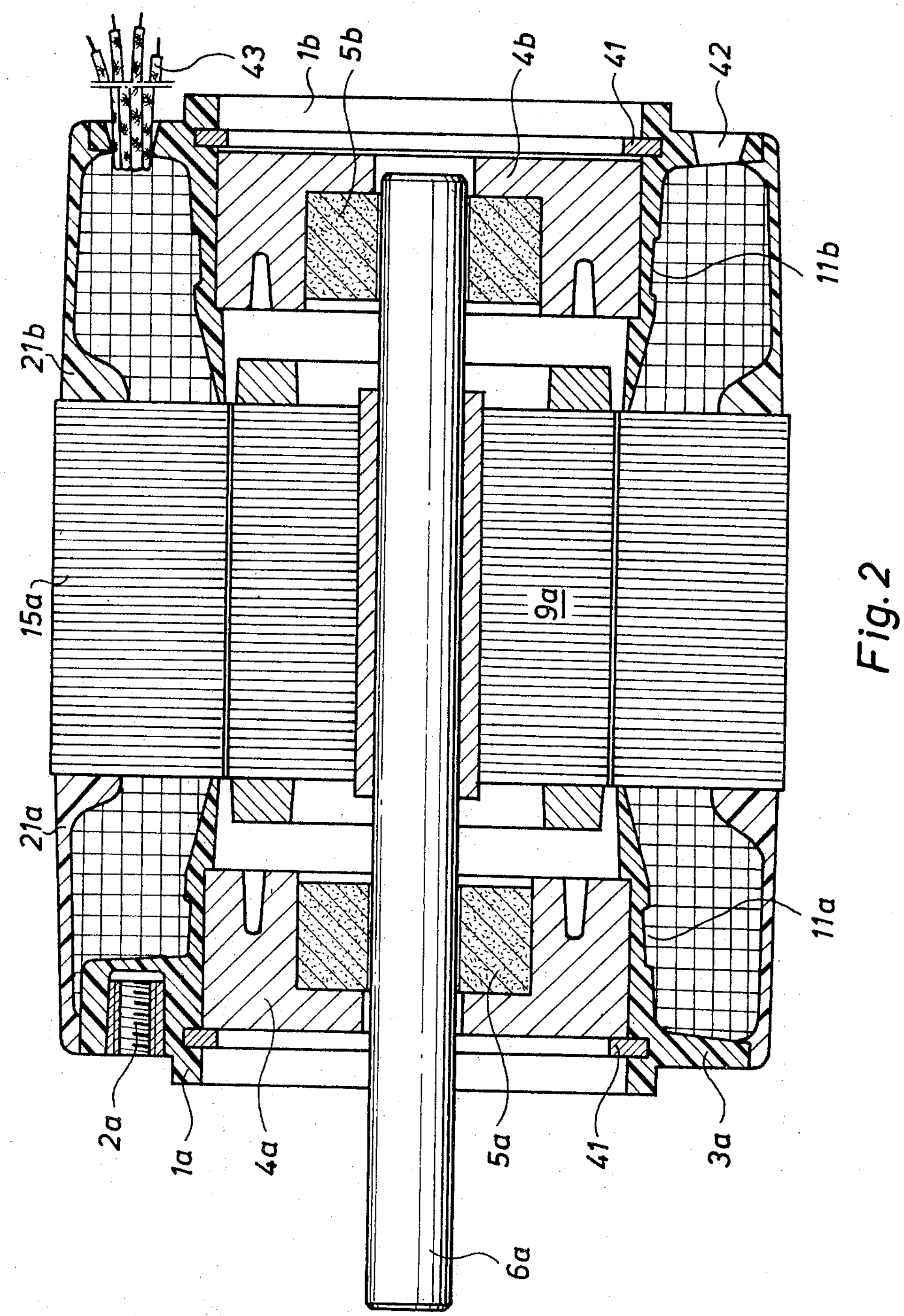
FIG. 2 shows another embodiment of a squirrel-cage motor designed as a canned motor.

The squirrel-cage motor illustrated in FIG. 2 has a casing 1*a*, especially of plastic, which has an annular collar 3*a* with receiving holes for a mounting member 2*a*. The casing 1*a* can also be of metal if at least its outer surface is electrically insulated. Inserted in casing 1*a* by means of a bearing flange 4*a* is a sleeve bearing 5*a*, especially of carbon, which mounts a motor shaft 6*a* extending through the bearing. An annular groove 11*a* is provided on the outer circumference of that section of casing 1*a* which surrounds sleeve bearing 5*a*. The outside of casing 1*a* is tapered toward stator 15*a* at least in the area of the latter and is an a contacting relationship with this stator 15*a*. On the side facing stator 15*a*, bearing flange 4*a* is in a contacting relationship with an inwardly projecting annular collar in casing 1*a*, and is retained, on the side facing away therefrom, by a spring ring 41 inserted in a groove in the annular collar. Mounted on motor shaft 6*a* and attached thereto is a rotor 9*a*.

Provided on the side opposite casing 1*a* is a casing 1*b*, corresponding generally with casing 1*a* and having apertures 42 for bringing out connecting leads 43. Inserted in casing 1*b* in the same manner as in casing 1*a* is a bearing flange 4*b*, receiving a bearing 5*b* which mounts motor shaft 6*a*.

Stator 15*a* with winding is located between two housing members 21*a* and 21*b* of cast resin or a similar substance. Embedded in the cast resin on both sides of stator 15*a* are projecting portions of the winding. Housing member 21*a* and 21*b* engage grooves 11*a* and 11*b* in casings 1*a* and 1*b*. Housing members 21*a* and 21*b* connect the two casings 1a and 1b with stator 15*a*. This produces a compact unit comprising the two casings 1*a* and 1*b*, stator 15*a*, the stator winding and housing members 21*a* and 21*b*. A casing designed as a casing without flange can also be employed instead of casings 1*a*, 1*b*, designed as an end plate.

Figure 3:
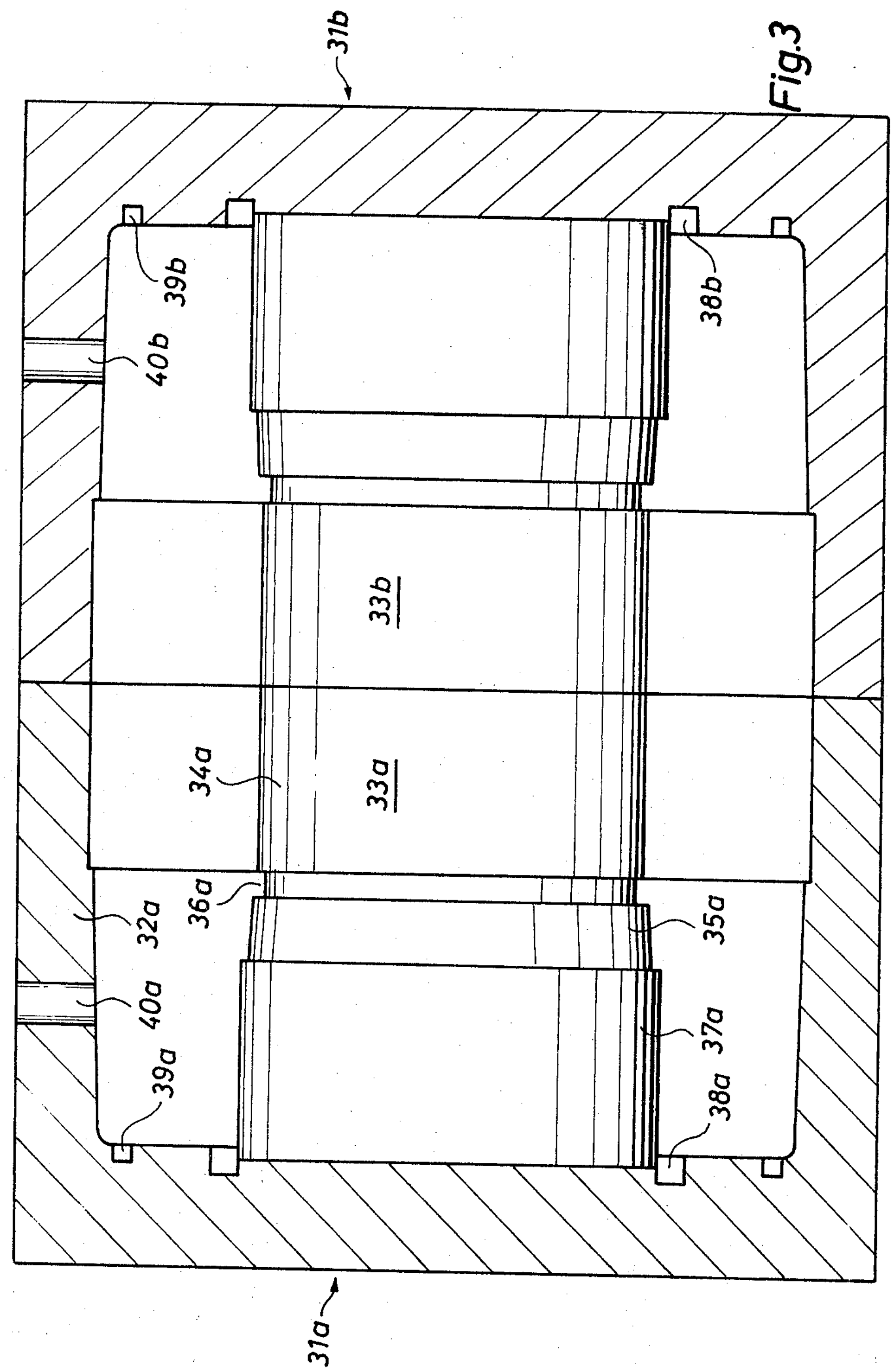
FIG. 3 shows the design of a two-section mould used in the construction of the motor of the present invention.

The mould illustrated in FIG. 3 is designed as a two-section mould. Each housing mould member 31*a* and 31*b* is designed in the same manner, so that it will suffice to describe only one of the housing mould members. Housing mould member 31*a* has an outer jacket 32*a* and a core 33*a*, which can be designed in one piece with outer jacket 32*a*. Core 33*a* has a cylindrical section 34*a*, whose outside diameter corresponds to the inside diameter of stator 15*a*. This is followed by an annular groove 36*a* for receiving a sealing ring, followed in turn by a tapered section 35*a*, whose outer surface is designed in accordance with the inner surface of casing 1*a* adjacent to rotor 9*a*. This is followed by a cylindrical section 37*a*, corresponding to the outside diameter of bearing flange 4*a*. The outwardly projecting section of casing 1*a* engages an annular groove 38*a*. An annular groove 39*a*, arranged in the area of the outside diameter of annular collar 3*a*, serves to receive a sealing ring. Located in the top of housing mould member 31*a* is an aperture 40*a* for introducing casting resin or a similar substance.

To fabricate the motor, housing mould 31*a*, 31*b* is opened. Then, one casing 1*a* or 1*b* is inserted in each of housing mould members 31*a* and 31*b* in such a manner that the ends of casings 1*a* and 1*b* are located at the bottom of housing mould members 31*a* and 31*b* and engage annular grooves 38*a* and 38*b* with their outer projections. Sealing rings inserted in annular grooves 36*a* and 39*a* seal the outer end and inner section of casing 1*a* against the penetration of casting resin between it and housing mould member 31*a*. Stator 15*a* with the winding section illustrated at the left in the drawing is then inserted in housing mould member 31*a*. Placing housing mould member 31*b* on the other winding section and the free half of stator 15*a* closes housing mould 31*a*, 31*b*, whereby housing mould members 31*a* and 31*b* are mutually aligned by means of a positive connection, a common planar support or similar means.

Casting resin or another castable or injectable, electrically insulating moulding substance is now introduced through casting apertures 40*a* and 40*b*. Housing mould 31*a*, 31*b* can be connected with a vacuum source in an unillustrated manner to avoid air pockets, whereby means must be provided to prevent casting resin from egressing from housing mould 31*a*, 31*b*. After the casting resin has set, which can be aided by heat treatment if desired, stator 15*a* is removed from housing mould 31*a*, 31*b*, along with housing members 21*a* and 21*b*, as well as casings 1*a* and 1*b*, which are attached thereto as a single piece. To finish the electric motor, bearing flange 4*a* is press-fitted into casing 1*a* and retained by means of spring ring 41. The bearing flnage can also be attached to the casing by means of screws, welding or bonding. The shaft, on which rotor 9*a* is mounted, is then inserted into bearing 5*a* from the opposite side. Sleeve bearing 5*b* is placed on motor shaft 6*a* from the other side, and bearing flange 4*b* is inserted in casing 1*b* and secured by means of spring ring 41. Members to which the cast resin or similar substance should not adhere can be provided with a mould-release agent in the appropriate locations.

The stator winding and its switching and flexible leads need not be armored, dressed or insulated to be embedded in housing members 21*a* and 21*b*, thereby resulting in significant work savings. In fabricating housing members 21a and 21b, a casting resin or similar substance is employed which is capable of transmitting the torques and forces occurring in the electric motor and connecting the bearings, with stator 15a interposed, firmly one with the other. Bearings 5a and 5b can be located with sufficient accuracy of alignment. An antifriction bearing can be employed in place of sleeve bearing 5a, 5b. To reinforce housing members 21a, 21b, in particular to avoid stress cracking in the plastic, it is possible to insert a reinforcement in housing mould 31a, 31b, especially in the form of glass fabric or a similar substance, which is embedded in the hollow areas of mould 31a, 31b when the resin or similar substance is cast or injected.

After casting, the stator winding must be sufficiently insulated from the casing. The employment of two preferably identical casings provides a high degree of accuracy, great dimensional stability and high mechanical strength. The casing permits the mould to be sealed in the area of the motor bearing seat or holder. The stator winding is prized by the casing without prior dressing.

Obviously, many modifications and variations of the present invention are possible in the light of the above teachings. It should therefore be understood that within the scope of the appended claims, the invention may be practiced otherwise than as specifically described.

Having thus fully disclosed my invention, what I claim is:

1. In an electric motor, especially a squirrel-cage motor, of the type having a rotor, a stator, a stator winding, bearings for rotatably supporting the rotor, a housing and end bushings for supporting and retaining bearing carriers and the bearings, the improvement comprising means defining annular grooves in said end bushings extending radially at right angles to the rotor axis, said housing being a cast mass integrally formed on said stator around said stator winding and in engagement with said grooves to retain said stator and bushings against relative axial movement, said cast mass forming at least part of the exterior surface of said motor, said end bushings each having an axially inwardly extending bore to receive a bearing carrier, at least the portions of said end bushings adjacent said stator including electrically nonconductive material to electrically isolate said stator from said bearing carriers, and means for retaining at least one of said carriers in said bushings.

2. In a motor according to claim 1 wherein each said bore for receiving the bearing carrier comprises an axially inwardly extending annular recess terminating in an outwardly facing annular shoulder to limit the inward axial movement of said bearing carrier, said means for retaining being positioned to act against a surface of said bearing carrier facing away from said shoulder.

3. A motor according to claim 1 wherein said end bushings each have a larger internal diameter than said stator.

* * * * *